US012680531B2

(12) United States Patent
Kristensen et al.

(10) Patent No.: US 12,680,531 B2
(45) Date of Patent: Jul. 14, 2026

(54) METHOD FOR PLANNING INSTALLATION OF A WIND TURBINE COMPONENT

(71) Applicant: Vestas Wind Systems A/S, Aarhus N. (DK)

(72) Inventors: Mads Møller Kristensen, Silkeborg (DK); Sedin Buzdalek, Randers NV (DK)

(73) Assignee: Vestas Wind Systems A/S, Aarhus N. (DK)

( * ) Notice: Subject to any disclaimer, the term of this patent is extended or adjusted under 35 U.S.C. 154(b) by 285 days.

(21) Appl. No.: 18/707,214

(22) PCT Filed: Sep. 6, 2022

(86) PCT No.: PCT/DK2022/050181
§ 371 (c)(1),
(2) Date: May 3, 2024

(87) PCT Pub. No.: WO2023/083424
PCT Pub. Date: May 19, 2023

(65) Prior Publication Data
US 2026/0160232 A1      Jun. 11, 2026

(30) Foreign Application Priority Data
Nov. 10, 2021    (DK) ........................... PA 2021 70548

(51) Int. Cl.
*F03D 13/10*              (2016.01)
*F03D 13/25*              (2016.01)

(52) U.S. Cl.
CPC .......... *F03D 13/104* (2023.08); *F03D 13/116* (2023.08); *F03D 13/25* (2016.05);
(Continued)

(58) Field of Classification Search
CPC ....... F03D 13/104; F03D 13/116; F03D 13/25
See application file for complete search history.

(56) References Cited

U.S. PATENT DOCUMENTS

2010/0183440 A1      7/2010      Von Mutius et al.
2014/0244328 A1      8/2014      Zhou et al.

FOREIGN PATENT DOCUMENTS

EP            3029313 A1      6/2016
ES            2537586 A1      6/2015
(Continued)

OTHER PUBLICATIONS

Danish Patent and Trademark Office, 1st technical examination issued in corresponding DK Application No. PA 2021 70548, dated May 3, 2022.
(Continued)

*Primary Examiner* — James Sanders
(74) *Attorney, Agent, or Firm* — Wood, Herron & Evans LLP

(57)              ABSTRACT

A method for planning installation of a wind turbine component, such as a wind turbine blade, of an offshore wind turbine (1) is disclosed. A digital model (7) of the wind turbine (1) is generated, based on input regarding design specifications of at least the tower (2) of the wind turbine (1), and input regarding seabed conditions at a site where the wind turbine (1) is located. Meteorological prediction data related to a predefined future time period and to the site where the wind turbine (1) is located is applied to the digital model (7) of the wind turbine (1), and an estimate for expected tower oscillations during the predefined future time period is generated, based thereon. At least one time slot during the predefined future time period is identified, where the estimated expected tower oscillations are below a predefined threshold value, and installation of the wind turbine component is scheduled during one of the identified time slots.

8 Claims, 2 Drawing Sheets

(52) U.S. Cl.
CPC ... *F05B 2240/96* (2013.01); *F05B 2260/8211*
(2013.01); *F05B 2260/84* (2013.01)

(56) References Cited

FOREIGN PATENT DOCUMENTS

| WO | 2018228809 A1 | 12/2018 |
| WO | 2020001720 A1 | 1/2020 |
| WO | 2021115542 A1 | 6/2021 |
| WO | 2021133249 A1 | 7/2021 |
| WO | 2021175398 A1 | 9/2021 |

OTHER PUBLICATIONS

International Searching Authority, International Search Report and Written Opinion issued in corresponding PCT Application No. PCT/DK2022/050181, dated Nov. 25, 2022.
Kumar Vigney, Optimization of Offshore Wind Farm Installation Procedure With a Targeted Finish Date, Nov. 24, 2017, XP055980182, retrieved from the Internet: URL:https://uuid:14461c46-90a3-44b8-8b64-ac6dae303f88/datastream/OBJ/download [retrieved on Nov. 10, 2022].

METHOD FOR PLANNING INSTALLATION OF A WIND TURBINE COMPONENT

FIELD OF THE INVENTION

The present invention relates to a method for planning installation of a wind turbine component, such as a wind turbine blade, of an offshore wind turbine. The method according to the invention provides a basis for taking a well informed decision regarding whether or not to schedule installation of the wind turbine component within a given time slot.

BACKGROUND OF THE INVENTION

When installing wind turbine components on offshore wind turbines, e.g. during erection of the wind turbine or due to replacement, repair, maintenance, etc., it is necessary to book a relevant crew, one or more relevant seagoing vessels, such as barges, and possibly lifting equipment, such as a crane. Accordingly, the costs involved with scheduling installation of a wind turbine component of an offshore wind turbine are high, and it is therefore important that it is in fact possible to carry out the installation at the scheduled time, since a cancellation of the installation would incur high expenses.

When installing wind turbine components offshore, the weather conditions play an important role with regard to whether or not the installation can be carried out. For instance, high waves may introduce large relative movements between the wind turbine and a seagoing vessel moored at the wind turbine and carrying the component to be installed, and such relative movements may make the installation process difficult, or even impossible, to carry out. Furthermore, wave conditions and/or tidal conditions may affect the tower and/or the foundation structure of the wind turbine in a manner which causes the tower to oscillate. Such tower oscillations may also make it difficult to carry out the installation process, possibly to the extent that a scheduled installation must be cancelled, e.g. due to risk of collisions between the wind turbine component to be installed and the tower.

On the other hand, a precautious approach where installation of a wind turbine component is only scheduled for time slots where it is absolutely certain that wind or wave conditions will not prevent the installation, may result in situations where installation windows which were actually suitable are missed. This may prolong the time before the wind turbine is operational, thereby adding to the costs involved with the installation.

It is therefore desirable to be able to accurately predict whether or not it will be possible to carry out installation of a specific wind turbine component of an offshore wind turbine during a given time slot.

DESCRIPTION OF THE INVENTION

It is an object of embodiments of the invention to provide a method for planning installation of a wind turbine component of an offshore wind turbine, which minimises the risk of cancellation of the installation.

It is a further object of embodiment of the invention to provide a method for planning installation of a wind turbine component of an offshore wind turbine, which reduces the average costs of installing the wind turbine component.

The invention provides a method for planning installation of a wind turbine component of an offshore wind turbine, the wind turbine comprising a tower mounted on a foundation structure, the method comprising the steps of:

generating a digital model of the wind turbine, based on input regarding design specifications of at least the tower of the wind turbine, and input regarding seabed conditions at a site where the wind turbine is located, obtaining meteorological prediction data related to a predefined future time period and to the site where the wind turbine is located, applying the meteorological prediction data to the digital model of the wind turbine, and generating an estimate for expected tower oscillations during the predefined future time period, based thereon, identifying at least one time slot during the predefined future time period, where the estimated expected tower oscillations are below a predefined threshold value, and scheduling installation of the wind turbine component during one of the identified time slots.

Thus, the method according to the invention is a method for planning installation of a wind turbine component of an offshore wind turbine. In the present context, the term 'offshore wind turbine' should be interpreted to mean a wind turbine which is positioned offshore, i.e. at a sea or a lake. Thus, an offshore wind turbine can only be reached by means of seagoing vessels or from the air, e.g. by helicopter or drone. Furthermore, an offshore wind turbine is in contact with water, and thereby affected by waves occurring in the water.

The wind turbine component being installed may be any suitable component, including, but not limited to, a wind turbine blade, a nacelle, a tower section, a hub, a drivetrain component, such as a gearbox, a main shaft, etc. Furthermore, the wind turbine component being installed may be a suitable combination of the wind turbine components mentioned above, e.g. a nacelle carrying an hub and one or more wind turbine blades.

The wind turbine comprises a tower mounted on a foundation structure. In the present context the term 'tower' should be interpreted to mean a substantially vertically extending column-like structure which carries energy producing parts of the wind turbine, e.g. housed in a nacelle. In the present context the term 'foundation structure' should be interpreted to mean a structure which is directly or indirectly connected to the seabed, and on which the tower is mounted. Thus, the foundation structure positions the wind turbine at the site. The foundation structure may be directly anchored in the seabed. In this case the foundation structure may, e.g., be or comprise a monopile, a tripod, etc. As an alternative, the foundation structure may be indirectly anchored to the seabed. In this case the foundation structure may, e.g., be or comprise a floating foundation and one or more mooring lines connected to anchoring points on or in the seabed. Furthermore, the foundation structure may include a transition piece interconnecting the tower and a proper foundation, e.g. in the form of a monopile or a tripod.

In the method according to the invention, a digital model of the wind turbine is initially generated. The digital model is generated based on input regarding design specifications of at least the tower of the wind turbine, and based on input regarding seabed conditions at the site where the wind turbine is located.

In the present context, the term 'digital model' should be interpreted to mean a digital representation of the actual wind turbine, which reflects relevant characteristics of the wind turbine, in particular mechanical characteristics which are relevant with respect to the behaviour of the wind turbine in response to various external conditions. Thus, the digital model of the wind turbine can be used for simulating behaviour of the wind turbine in response to external impact on the wind turbine.

The design specifications of the tower may, e.g., include specifications regarding stiffness, damping coefficients, information regarding material, wall thickness, mass, mass distribution, dimensions, geometry, eigenfrequencies, etc. Furthermore, similar design specifications regarding the foundation structure or other parts connected to the tower may be included, for instance a nacelle mounted on the tower. This is in particular relevant with regard to the mass distribution of the structure.

The input regarding seabed conditions may, e.g., include information regarding plasticity or compliance of the seabed. Furthermore, the input regarding seabed conditions may include measured soil data obtained at the site.

Thus, the input provided to the digital model contains structural information regarding the combined structure which the wind turbine component is to be mounted on, including the tower and an interface between the wind turbine and the seabed. Accordingly, the resulting digital model can be used for simulating or predicting how this entire structure will react to certain external impact. Furthermore, the digital model reflects the actual design specifications applied regarding the actual wind turbine, as well as the actual conditions of the seabed at the site of the wind turbine.

When it is desired to schedule a time slot for installing the wind turbine component, meteorological prediction data related to a predefined future time period and to the site where the wind turbine is located, is obtained. The meteorological prediction data may, e.g., be obtained from a weather forecast service, and it may include information regarding predicted wind conditions, wave conditions, tidal conditions etc. This will be described in further detail below. In any event, the meteorological prediction data reflects the meteorological conditions which the wind turbine is expected to experience during the predefined future time period, and thereby the expected impact from the meteorological conditions on the wind turbine. The future time period may, e.g., be the next week or the next couple of days.

The meteorological prediction data is then applied to the digital model of the wind turbine. As described above, the digital model of the wind turbine may be used for simulating or predicting how the wind turbine will react to specific external impact. Furthermore, as described above, the meteorological prediction data represents expected meteorological impact on the wind turbine, during the predefined future time period. Thus, based on the meteorological prediction data applied to the digital model of the wind turbine, an estimate for expected tower oscillations during the predefined future time period is generated.

Since the digital model of the wind turbine is generated from actual design specifications of the actual wind turbine as well as actual seabed conditions, and since the meteorological prediction data are expected to be accurate, it can also be expected that the estimate for expected tower oscillations during the predefined future time period is accurate.

Next, at least one time slot during the predefined future time period is identified, where the estimated expected tower oscillations are below a predefined threshold value. The predefined threshold value should be selected in such a manner that tower oscillations below the threshold value will not prevent installation of the wind turbine component.

The at least one time slot should have a length which is sufficient to allow the installation of the wind turbine component to be completed, for instance 2-4 hours.

Finally, installation of the wind turbine component is scheduled during one of the identified time slots.

Accordingly, installation of the wind turbine component is scheduled during a time slot where it is highly likely that the tower oscillations caused by impact from meteorological conditions will not prevent installation of the wind turbine component. Thereby the risk of having to cancel or abort the installation process is minimised.

Furthermore, the precise prediction provided by the method according to the invention minimises the risk of missing appropriate installation time slots and associated prolonging of the time before the wind turbine is operational.

Accordingly, the method according to the invention provides an accurate prediction of whether or not installation of the wind turbine component will be possible, and thereby provides a valuable tool for selecting an appropriate time slot for scheduling the installation with a minimised risk of cancellation and a minimised risk of missed appropriate time slots.

It is noted that the method according to the invention may also be applied for planning demounting of a wind turbine component from the wind turbine, since this will be subject to essentially the same constraints with regard to tower oscillations caused by meteorological conditions.

The meteorological prediction data may include wave data at or near the site where the wind turbine is located.

Waves have a significant impact on offshore wind turbines, in particular on foundation structure and tower, and particular in terms of causing oscillations of the tower, because the waves act directly on the foundation structure and tower, and with large force. Wave data is therefore relevant when estimating expected tower oscillations.

The wave data may, e.g., include data regarding expected wave height and/or expected peak-to-peak period of the waves.

Alternatively or additionally, the meteorological prediction data may include data regarding expected tidal conditions, such as expected tide water level, expected current conditions, expected wind conditions, and/or any other suitable meteorological conditions which may have an impact on expected tower oscillations.

The step of generating a digital model of the wind turbine may comprise generating a digital model of the wind turbine without the component to be mounted. According to this embodiment, the digital model reflects the structure onto which the wind turbine component is to be installed. Thereby the resulting estimated expected tower oscillations accurately reflect the actual conditions which the installation crew is facing when the wind turbine component is being installed, i.e. oscillations of the structure onto which the wind turbine component is being installed. This provides a good basis for deciding whether or not to schedule the installation within a particular time slot.

The wind turbine component may be a wind turbine blade, and the step of generating a digital model of the wind turbine may comprise generating a digital model of the tower mounted on the foundation structure, and with a nacelle mounted on the tower.

One procedure which is often applied when erecting a wind turbine is to first erect the tower on top of a foundation structure, then install the nacelle with the drive train and the hub on top of the tower, and finally installing the wind turbine blades on the hub. The nacelle, the hub and the drive train may be installed in single lift operation or in several lifting operations, depending on the lifting capacity of the crane used for the installation. For instance, the nacelle, possibly housing the drive train, may be lifted in one lifting operation, and the hub, possibly carrying one or more wind turbine blades, may be lifted in a subsequent lifting operation.

In any event, once the nacelle with the hub and the drive train is in position on top of the tower, this constitutes a large mass on the top of the tower, which has a significant impact on how the tower oscillates in response to external impact, e.g. from waves. Accordingly, it is an advantage that this is taken into account when generating the digital model of the wind turbine, since the digital model thereby closely reflect the structure onto which the wind turbine blade is to be installed.

As an alternative, the wind turbine component may be a nacelle, and the step of generating a digital model of the wind turbine may comprise generating a digital model of the tower mounted on the foundation structure. Also in this case, the digital model accurately corresponds to the structure onto which the nacelle is to be installed. The nacelle may carry the hub and possibly one or more wind turbine blades.

As another alternative, the wind turbine component may be a tower section which is to be installed on top of the foundation structure or on top of another tower section, during erection of the tower.

The foundation structure may comprise a monopile. Waves are expected to have a high impact on monopiles, in particular with regard to introducing oscillations in the monopile and thereby in the tower mounted thereon. Therefore the method according to the invention is particularly relevant for offshore wind turbines mounted on monopiles.

Alternatively, the foundation structure may comprise another kind of suitable foundation, such as a tripod, a floating foundation, etc.

The method may further comprise the step of mounting the wind turbine component on the wind turbine during the scheduled time slot. According to this embodiment, the scheduled installation is in fact carried out.

The wind turbine may be arranged in an offshore wind farm comprising a plurality of wind turbines, and the method may further comprise the step of scheduling installation of a wind turbine component of at least one of the other wind turbines of the wind farm, during one of the identified time slots.

Wind turbines, in particular offshore wind turbines, are often arranged in wind farms, where a plurality of wind turbines are grouped together. In the present context the term 'wind farm' should be interpreted to mean a plurality of wind turbines arranged at distributed positions within a specified geographical area, i.e. a site, and which share some infrastructure, such as internal power grid, connection to an external power grid, substations, etc.

When a seagoing vessel, installation crew, etc. is booked for installing a wind turbine component on a wind turbine of an offshore wind farm, it may be desirable to also use the seagoing vessel and the crew for installing wind turbine components on one or more of the other wind turbines of the wind farm, thereby efficiently utilising the booked resources. The wind turbines of a wind farm are often designed with identical design specifications. Furthermore, the seabed conditions are not expected to vary significantly across the site of the wind farm. Therefore the same digital model can be applied for all of the wind turbines of the wind farm. Furthermore, it may also be expected that the meteorological prediction data applies to all of the wind turbines. Thus, the suitable time slots which are identified when performing the method according to the invention can also be expected to apply to all of the wind turbines of the wind farm.

The time slot selected for installing the wind turbine component of the at last one other wind turbine may be the same as the time slot selected for installing the wind turbine component of the wind turbine. In this case installation of wind turbine components on at least two wind turbines is scheduled within the same time slot. In this case the time slot should, of course, be sufficiently long to carry out all of the scheduled installations. As an alternative, one or more other time slots may be selected for scheduling installation of wind turbine components of the one or more other wind turbines.

BRIEF DESCRIPTION OF THE DRAWINGS

The invention will now be described in detail with reference to the accompanying drawings in which.

DETAILED DESCRIPTION OF THE DRAWINGS

Figure 1:
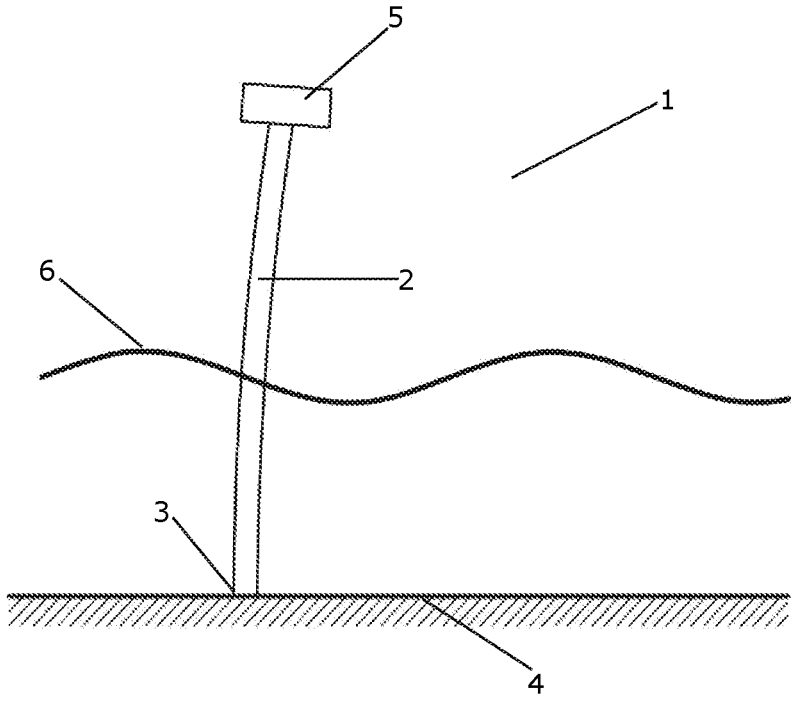
FIG. 1 is a schematic view of an offshore wind turbine for performing a method according to an embodiment of the invention.

FIG. 1 is a schematic view of an offshore wind turbine 1, i.e. a wind turbine 1 arranged at sea. The wind turbine 1 comprises a tower 2 mounted on a foundation structure 3 anchored in a seabed 4. A nacelle 5 is mounted on top of the tower 2, but no hub or wind turbine blades are mounted on the nacelle.

The tower 2 and the foundation 3 of the wind turbine 1 are affected by various meteorological factors, in particular by waves 6.

Tower oscillations induced by the waves 6 may reach a level where it is not possible to install a hub and/or one or more wind turbine blades on the wind turbine 1. It is therefore desirable to be able to plan installation of the hub and/or the wind turbine blades on the wind turbine 1 during a time slot where the tower oscillations are below such a level, without unnecessarily postponing the installation of the hub and/or the wind turbine blades.

In order to obtain this, a digital model of the wind turbine 1 is generated, based on input regarding design specifications of the tower 2, and preferably of the foundation structure 3, of the wind turbine 1, and based on input regarding conditions of the seabed 4. The design specification of the tower 2, and possibly the foundation structure 3, may include specifications regarding stiffness, damping coefficients, eigenfrequencies, etc. The input regarding seabed conditions may, e.g., include information regarding plasticity or compliance of the seabed 4.

Thus, the digital model of the wind turbine 1 reflects structural information regarding the combined structure of the tower 2, carrying the nacelle 5, and anchored to the seabed 4 via the foundation structure 3, and the digital model of the wind turbine 1 can therefore be used for simulating or predicting how this entire structure will react to certain external impact, notably to impact from waves 6.

When it is desired to schedule installation of the hub and/or the wind turbine blades on the wind turbine 1, meteorological prediction data related to a future time period, and related to the site of the wind turbine 1, is obtained. The meteorological prediction data preferably comprises data regarding expected wave conditions at the site of the wind turbine 1 during the future time period.

The meteorological prediction data is then applied to the digital model of the wind turbine 1. The digital model is then used for simulating how the wind turbine 1 will react to the expected wave conditions during the future time period. Thereby an estimate for the expected tower oscillations is generated.

Next, at least one time slot is identified, during the future time period, where the estimated tower oscillations are below a predefined threshold value, which allows safe installation of the hub and/or the wind turbine blades on the wind turbine 1. Finally, the installation of the hub and/or the wind turbine blades is scheduled during one of the identified time slots.

Figure 2:
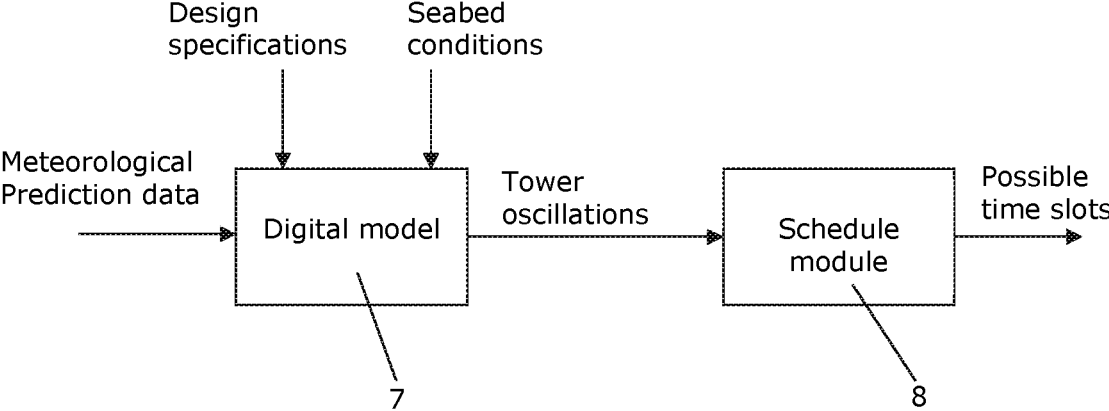
FIG. 2 is a schematic diagram illustrating a method according to an embodiment of the invention.

FIG. 2 is a schematic diagram illustrating a method according to an embodiment of the invention.

A digital model 7 of an offshore wind turbine is generated by supplying design specifications regarding at least a tower of the wind turbine, and preferably also regarding a foundation structure of the wind turbine. Furthermore, input regarding seabed conditions at the site where the wind turbine is located, is supplied to the digital model 7. Thus, the digital model 7 accurately reflects structural parameters and expected behaviour of the wind turbine at the site.

When it is desired to install a wind turbine component, e.g. a wind turbine blade, on the wind turbine, meteorological prediction data related to a predefined future time period and to the site where the wind turbine is located, is supplied to the digital model 7. The meteorological prediction data preferably includes wave data, such as expected wave height and/or expected peak-to-peak wave period.

Based on the meteorological prediction data, the digital model simulates how the wind turbine is expected to react to the forecasted meteorological conditions, and estimates tower oscillations caused thereby, and during the predefined future time period. The estimated tower oscillations are supplied to a schedule module 8, where at least one time slot during the predefined future time period is identified, where the tower oscillations are estimated to be below a predefined threshold value, which allows installation of the wind turbine component. Finally, installation of the wind turbine component is scheduled during one of the identified, suitable time slots.

The invention claimed is:

1. A method for planning installation of a wind turbine component of an offshore wind turbine, the wind turbine comprising a tower mounted on a foundation structure, the method comprising the steps of:

generating a digital model of the wind turbine, based on input regarding design specifications of at least the tower of the wind turbine, and input regarding seabed conditions at a site where the wind turbine is located, obtaining meteorological prediction data related to a predefined future time period and to the site where the wind turbine is located, applying the meteorological prediction data to the digital model of the wind turbine, and generating an estimate for expected tower oscillations during the predefined future time period, based thereon, identifying at least one time slot during the predefined future time period, where the estimated expected tower oscillations are below a predefined threshold value, and scheduling installation of the wind turbine component during one of the identified time slots.

2. A method according to claim 1, wherein the meteorological prediction data includes wave data at or near the site where the wind turbine is located.

3. A method according to claim 1, wherein the step of generating a digital model of the wind turbine comprises generating a digital model of the wind turbine without the component to be mounted.

4. A method according to claim 1, wherein the wind turbine component is a wind turbine blade, and wherein the step of generating a digital model of the wind turbine comprises generating a digital model of the tower mounted on the foundation structure, and with a nacelle mounted on the tower.

5. A method according to claim 1, wherein the wind turbine component is a nacelle, and wherein the step of generating a digital model of the wind turbine comprises generating a digital model of the tower mounted on the foundation structure.

6. A method according to claim 1, wherein the foundation structure comprises a monopile.

7. A method according to claim 1, further comprising the step of mounting the wind turbine component on the wind turbine during the scheduled time slot.

8. A method according to claim 1, wherein the wind turbine is arranged in an offshore wind farm comprising a plurality of wind turbines, and wherein the method further comprises the step of scheduling installation of a wind turbine component of at least one of the other wind turbines of the wind farm, during one of the identified time slots.

* * * * *